Patented Oct. 20, 1931

1,828,182

UNITED STATES PATENT OFFICE

BERT Y. GOLDING, OF LONG BEACH, AND JOHN J. BURKHARD, OF ANAHEIM, CALIFORNIA

SEALING PASTE

No Drawing.  Application filed April 20, 1929. Serial No. 356,874.

This invention relates to a sealing paste which is especially adapted for joints formed between detachable parts, such as cylinder heads, steam boilers, pipe flanges, and other parts which are subjected to heat. Our paste may also be applied to tool joints, underreamers, and all threaded connections employed in the drilling of wells, a particular advantage of our paste being its lubricating qualities which will eliminate wear on the threads and permit easy separation of the joints.

Our paste consists of distillery residue mixed with graphite. This distillery residue is a product which heretofore was not commercially useful as a paste ingredient and may be obtained as follows: Molasses is mixed with water, yeast and sulphuric acid, which causes the molasses to ferment. This fermentation converts the sugar in the molasses into alcohol and carbon dioxide. The carbon dioxide passes off in the form of gas during the fermentation process and the alcohol is removed by distillation.

After the chemical changes caused by fermentation have been completed and the alcohol is removed by distillation, or any other suitable process, the residue is no longer molasses and it is this residue which we utilize in our paste after it has been further concentrated by evaporation or otherwise. After the chemical changes, caused by fermentation, during which all of the fermentable sugars are removed, the residue is the product useful in our paste.

Our paste is mixed in the following proportions, by volume: 55% graphite and 45% distillery residue. These substances are thoroughly mixed and are allowed to stand for a considerable length of time until the admixing is completed. This substance is then placed in containers for use. The paste may be mixed with water or oil, as desired. When mixed with oil the paste has the advantage of being a lubricant, and may be used on threaded joints, such as pipe joints, tools, and the like.

The distillery residue has the feature of expanding under heat and hardening, thus thoroughly and affectively sealing the joint.

Having described our invention, we claim:

1. A sealing paste comprising 55% graphite and 45% distillery residue, from the treatment of molasses.

2. A sealing paste comprising the concentrated distillery residue from the fermentation of molasses, said residue being mixed with graphite.

3. A sealing paste comprising distillery residue from the treatment of molasses to remove the sugars therefrom, said residue being mixed with graphite, and a lubricating oil.

4. A sealing paste comprising 45% concentrated distillery residue from the fermentation of molasses, and 55% graphite.

In testimony whereof, we affix our signatures.

BERT Y. GOLDING.
JOHN J. BURKHARD.